US010574359B2

(12) United States Patent
Chan et al.

(10) Patent No.: US 10,574,359 B2
(45) Date of Patent: Feb. 25, 2020

(54) SINGLE-WAVELENGTH BIDIRECTIONAL TRANSCEIVER WITH INTEGRATED OPTICAL FIBER COUPLER

(71) Applicant: The Boeing Company, Chicago, IL (US)

(72) Inventors: Eric Y. Chan, Mercer Island, WA (US); Dennis G. Koshinz, Bellevue, WA (US); Tuong K. Truong, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/926,308

(22) Filed: Mar. 20, 2018

(65) Prior Publication Data

US 2019/0296828 A1 Sep. 26, 2019

(51) Int. Cl.
| | |
|---|---|
| *H04B 10/40* | (2013.01) |
| *H04B 10/25* | (2013.01) |
| *G02B 6/02* | (2006.01) |
| *G02B 6/38* | (2006.01) |
| *G02B 6/42* | (2006.01) |
| *H04B 10/2581* | (2013.01) |

(52) U.S. Cl.
CPC ......... *H04B 10/40* (2013.01); *G02B 6/02038* (2013.01); *G02B 6/3897* (2013.01); *G02B 6/4257* (2013.01); *G02B 6/4263* (2013.01); *G02B 6/4278* (2013.01); *H04B 10/2503* (2013.01); *H04B 10/2581* (2013.01)

(58) Field of Classification Search
CPC ............................ H04B 10/2503; H04B 10/40
See application file for complete search history.

(56) References Cited

U.S. PATENT DOCUMENTS

| | | | |
|---|---|---|---|
| 5,285,512 A | 2/1994 | Duncan et al. | |
| 5,317,440 A | 5/1994 | Hsu | |
| 5,937,125 A * | 8/1999 | Creswick | G02B 6/4277 385/75 |

(Continued)

FOREIGN PATENT DOCUMENTS

JP        H04217209 A      8/1992

OTHER PUBLICATIONS

Extended European Search Report dated Jul. 23, 2019 in European Application No. 19162016.0 (European counterpart of the instant application).

*Primary Examiner* — Nathan M Cors
(74) *Attorney, Agent, or Firm* — Ostrager Chong Flaherty & Broitman P.C.

(57) ABSTRACT

An apparatus configured to function as a pluggable single-wavelength bidirectional transceiver in a switching network. The apparatus includes: a 2×1 fusion coupler; an input/output optical fiber, a detector optical subassembly (OSA) fiber and a laser OSA fiber all connected to the 2×1 fusion coupler; and a transceiver that includes a transceiver electronic circuit printed wiring board (PWB) and laser and detector OSAs electrically coupled to the transceiver electronic circuit PWB. The laser OSA includes a laser that is situated to transmit light to the laser OSA fiber, while the detector OSA includes a photodetector that is situated to receive light from the detector OSA fiber. The transceiver electronic circuit PWB also includes a multiplicity of transceiver input/output metal contacts arranged at one pluggable end of the PWB.

19 Claims, 12 Drawing Sheets

(56) References Cited

U.S. PATENT DOCUMENTS

| | | | |
|---|---|---|---|
| 6,815,828 B1* | 11/2004 | Coronel | H01L 25/0657 |
| | | | 257/777 |
| 7,171,081 B1 | 1/2007 | Ko et al. | |
| 7,359,592 B2 | 5/2008 | Truong | |
| 7,965,913 B2 | 6/2011 | Chan et al. | |
| 8,554,032 B2 | 10/2013 | Koshinz et al. | |
| 9,297,970 B1 | 3/2016 | Chan et al. | |
| 9,438,338 B1 | 9/2016 | Chan et al. | |
| 9,778,419 B1 | 10/2017 | Chan et al. | |
| 2012/0027415 A1* | 2/2012 | Chan | H04B 10/504 |
| | | | 398/115 |
| 2014/0344496 A1* | 11/2014 | Chan | G06F 13/40 |
| | | | 710/305 |
| 2015/0037046 A1 | 2/2015 | Chan et al. | |
| 2016/0085027 A1 | 3/2016 | Chan et al. | |
| 2018/0177042 A1* | 6/2018 | Kagaya | G02B 6/4284 |
| 2018/0375574 A1* | 12/2018 | Eddy | H04B 10/07955 |

\* cited by examiner

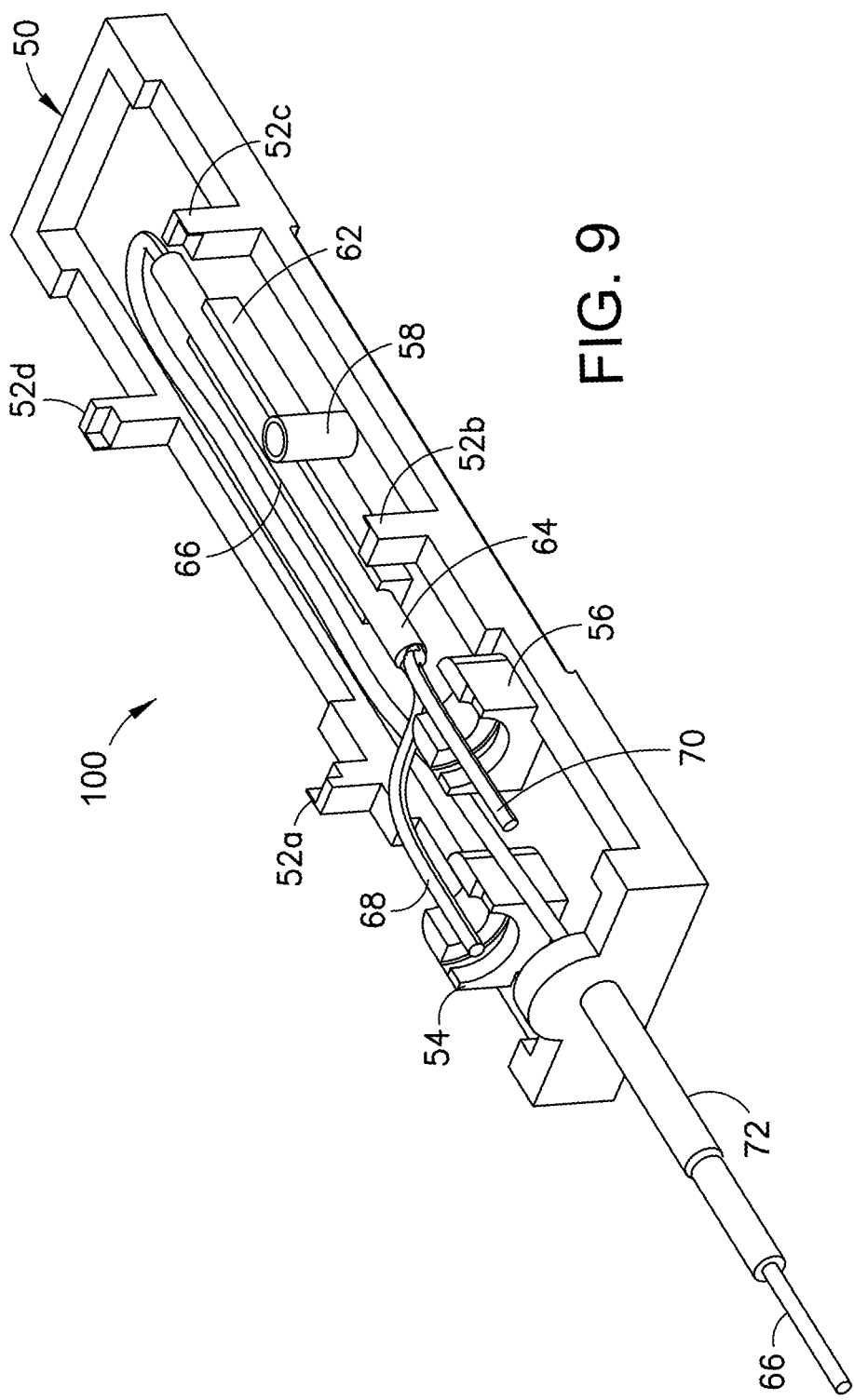

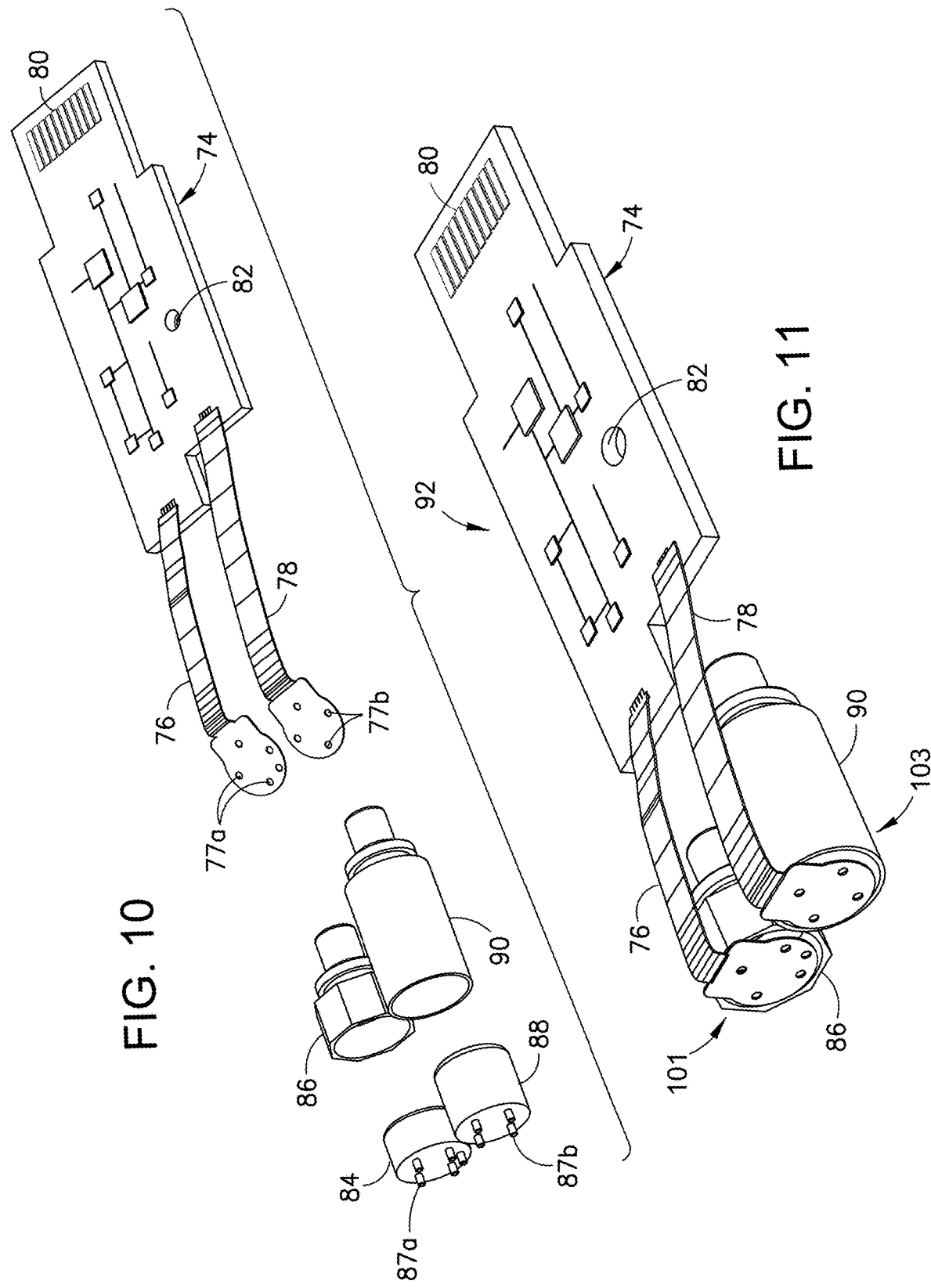

SINGLE-WAVELENGTH BIDIRECTIONAL TRANSCEIVER WITH INTEGRATED OPTICAL FIBER COUPLER

BACKGROUND

The technology disclosed herein generally relates to fiber optical networks that enable communication between electrical components.

Fiber optic bidirectional transceivers have been successfully deployed in avionics networks to replace copper cable for size, weight and power reduction. In addition, large-scale high-speed (e.g., greater than 1 Gbits/sec) switch networks have been proposed for a future generation of airplanes using a large number of single-fiber bidirectional optical links in the airplane.

The existing bidirectional transceivers used in some avionics networks require two wavelengths to operate. This creates a burden on designers and installers of large-scale switch network systems to keep track of the bidirectional transceivers with the correct matching wavelength pairs in each fiber optical link. For some large-scale switch networks designed for use in avionics systems, keeping track of the matching wavelength pair is a labor-intensive and time-consuming process which requires frequent re-work when a wrong wavelength transceiver is installed in the airplane's optical link.

Another bidirectional transceiver has been proposed in which the transmit and receive optical signals have the same wavelength. This proposed transceiver has a beam splitter installed at the optical subassembly (OSA), but this design needs to use an absorber to reduce reflection of the local laser. The large cross-talk and scattering of the optical reflection in the OSA would disable the bidirectional optical link operation. Therefore it would be inadvisable to produce a bidirectional transceiver based on this beam splitter design.

SUMMARY

The subject matter disclosed in some detail below is directed to a pluggable single-wavelength, bidirectional (i.e., single fiber) transceiver with integrated fusion coupler (instead of a beam splitter) that enables communication between electrical components (such as line replaceable units) at high data transmission rates (e.g., greater than 1 Gbits/sec). The subject matter disclosed below is further directed to a fabrication process that is based on modifying the packaging of a standard two-fiber high-speed SFP transceiver which is widely available at low cost.

In accordance with one embodiment, a 2×1 multi-mode glass optical fusion coupler (hereinafter "2×1 fusion coupler") is integrated inside the SFP transceiver package. The 2×1 fusion coupler is formed by a fusion process. By using a 2×1 fusion coupler, the use of a beam splitter (which is expensive to package) may be avoided. The 2×1 fusion coupler has very low back reflection (−40 dB or less), unlike the beam splitter approach. The 2×1 fusion coupler is remote from the OSA at the front end of the transceiver, thereby eliminating cross-talk between the local transmit laser and local receive photodetector. With this integrated glass coupler feature, the single-wavelength bidirectional transceiver design proposed herein enables the operation of 100 meter of error-free GbPOF link in a large-scale switching network with a large optical link margin.

In the particular embodiments disclosed herein, the single-wavelength, bidirectional transceiver is a small form-factor pluggable (SFP) transceiver, which has a form factor (including dimensions) as specified by an industrial standard multi-source agreement (MSA) under the auspices of the Small Form Factor Committee. SFP transceivers may be easily adapted to various fiber optic networking standards and easily incorporated in large-scale switch networks in avionics systems that employ optical fiber (plastic or glass) capable of transmitting data at rates faster than 1 Gbits/sec. However, the novel technical features disclosed herein are not dependent on whether the dimensions of the pluggable transceivers are compliant with any particular SFP specification. Applying the concepts disclosed herein, pluggable transceivers may be constructed that do not comply with SFP specifications.

Although various embodiments of a pluggable single-wavelength, bidirectional transceiver with integrated fusion coupler will be described in some detail below, one or more of those embodiments may be characterized by one or more of the following aspects.

One aspect of the subject matter disclosed in detail below is an apparatus comprising: a 2×1 fusion coupler; an input/output optical fiber connected to the 2×1 fusion coupler; a detector optical subassembly fiber connected to the 2×1 fusion coupler; a laser optical subassembly fiber connected to the 2×1 fusion coupler; and a transceiver comprising a transceiver electronic circuit printed wiring board, a laser optical subassembly electrically coupled to the transceiver electronic circuit printed wiring board and a detector optical subassembly electrically coupled to the transceiver electronic circuit printed wiring board. The laser optical subassembly comprises a laser that is situated to transmit light to the laser optical subassembly fiber. The detector optical subassembly comprises a photodetector that is situated to receive light from the detector optical subassembly fiber. The transceiver electronic circuit printed wiring board comprises a multiplicity of transceiver input/output metal contacts arranged at one end of the transceiver electronic circuit printed wiring board.

In accordance with some embodiments, the apparatus further comprises a metal base and a metal cover, wherein the transceiver electronic circuit printed wiring board and the metal cover are attached to the metal base, and the metal cover is open at one end to expose the transceiver input/output metal contacts, thereby enabling the corresponding metal contacts on an application hardware to be in contact with the transceiver input/output metal contacts when the one end of the transceiver electronic circuit printed wiring board is plugged into that application hardware. In one proposed implementation, the metal base comprises a fiber nose tube projecting from one end of the metal base, and the input/output optical fiber passes through the fiber nose tube. The apparatus further comprises a fiber boot that surrounds the fiber nose tube and a portion of the input/output optical fiber that projects beyond a distal end of the fiber nose tube.

Another aspect of the subject matter disclosed in detail below is a data transmission system comprising: an optical cable comprising a gigabit optical fiber; first and second 2×1 fusion couplers optically coupled to opposite ends of the optical cable; a first transceiver comprising a first laser and a first photodetector respectively optically coupled to the first 2×1 fusion coupler; and a second transceiver comprising a second laser and a second photodetector respectively optically coupled to the second 2×1 fusion coupler. The first and second lasers are configured to emit laser beams having wavelengths which are the same.

A further aspect of the subject matter disclosed in detail below is a method for assembling a pluggable transceiver package, comprising: fabricating a 2×1 fusion coupler; connecting an input/output optical fiber, a detector optical subassembly fiber and a laser optical subassembly fiber to the 2×1 fusion coupler; inserting the input/output optical fiber in a fiber nose tube projecting from one end of the metal base; attaching the 2×1 fusion coupler to the metal base; connecting laser and detector optical subassemblies to a transceiver electronic circuit printed wiring board by way of respective flex circuits; inserting one end of the detector optical subassembly fiber inside a detector optical subassembly; inserting one end of the laser optical subassembly fiber inside a laser optical subassembly; attaching the laser and detector optical subassemblies to the metal base; positioning the transceiver electronic circuit printed wiring board so that it overlies the metal base with the 2×1 fusion coupler between the transceiver electronic circuit printed wiring board and metal base; and attaching the transceiver electronic circuit printed wiring board to a multiplicity of printed wiring board support posts with retaining recesses on the metal base.

Other aspects of pluggable single-wavelength, bidirectional transceivers with integrated fusion couplers are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

FIGS. 6-15 are diagrams depicting various stages in the assembly of a pluggable single-wavelength bidirectional transceiver in accordance with one embodiment.

Reference will hereinafter be made to the drawings in which similar elements in different drawings bear the same reference numerals.

DETAILED DESCRIPTION

Figure 1:
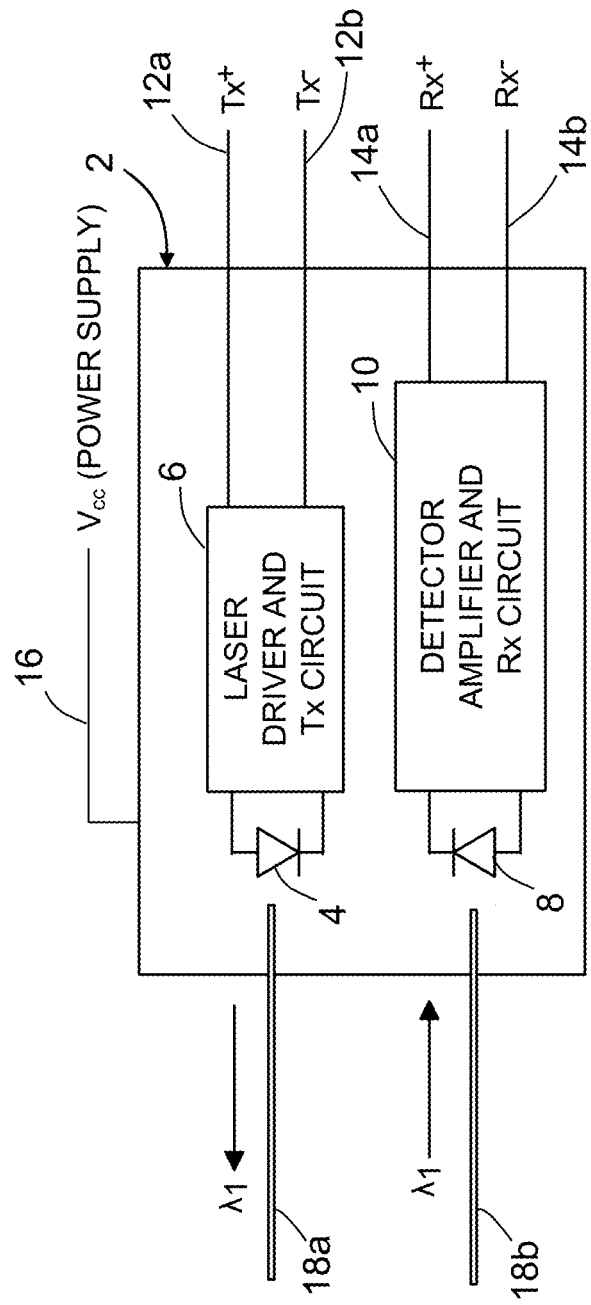
FIG. 1 is a block diagram identifying some features of a dual-fiber bidirectional SFP transceiver design in which the transceiver transmits and receives light of the same wavelength.

An optical fiber is a cylindrical dielectric waveguide that transmits light along its axis. The fiber consists of a transparent core surrounded by a transparent cladding layer (hereinafter "cladding"), both of which are made of dielectric materials. Light is kept in the core by the phenomenon of total internal reflection. To confine the optical signal in the core, the refractive index of the core is greater than that of the cladding. The boundary between the core and cladding may either be abrupt, as in step-index fiber, or gradual, as in graded-index fiber. Optical fibers can be made of glass or plastic.

Optical networking using plastic optical fiber (POF) has advantages over copper wiring in weight, size, bandwidth, power, and electromagnetic immunity. POF has advantages over glass optical fiber (GOF) in ease of handling, installation and maintenance. POF core material can range from acrylate to perfluorinated polymer. POF index profile can range from step index to graded index. POF geometry can range from single core to multi-core. Using POF may result in appreciable weight savings. The weight savings may be significant for networks onboard vehicles, such as airplanes, where the weight savings may result in reduced fuel consumption and lower emissions.

In a fiber optic system, it is typical for two optic fibers to be fused in an end-to-end arrangement to provide a continuous length of optic fiber. It is also common for optic fibers to be fused in a side-by-side arrangement, in which an elongate section of one optic fiber is fused to an elongate section of another optic fiber so that optical signals are transferred between the fused fibers. Such a side-by-side fused optical interface, which will be referred to herein as a "2×1 fusion coupler", allows for low insertion loss, low reflection and equal splitting of optical signals between the fused optical fibers.

It is common practice to connect a number of line replaceable units (LRUs) to each other to achieve communication within an avionics system. For example, a number of LRUs in the forward section of a vehicle (e.g., an airplane) have been connected to a number of LRUs in the aft section of the vehicle. Connecting each LRU to every other LRU could result in an unreasonably large number of connections. Additionally, many of the connections between LRUs may be long, resulting in optical losses.

Fiber optic networks have the advantages of higher speed, lower weight and electromagnetic interference immunity over copper networks. Many models of commercial airplanes have fiber optic networks for size, weight and power reduction. In some cases the large number of GOF cables in the airplane is an important factor contributing to high manufacturing cost. To reduce the cost for installing fiber optic network in airplane, there is a need to reduce the number of fiber optic cables used in the airplanes.

Fiber optic bidirectional transceivers have been successfully deployed in avionics networks to replace copper cable for size, weight and power reduction. A design and fabrication process is disclosed herein that integrates a low-loss and low-back-reflection optical fiber coupler into a modified small form factor pluggable (SFP) single-wavelength bidirectional transceiver. The single-wavelength bidirectional transceivers disclosed herein may be incorporated in large-scale switch networks in avionics systems that employ optical fiber (plastic or glass) capable of transmitting data at rates faster than 1 Gbits/sec. Such a plastic optical fiber will be referred to herein as a "gigabit plastic optical fiber" (GbPOF). Gigabit plastic optical fiber is made of ductile perfluorinated polymer and it does not break during tight cable bending. One example GbPOF has a 55-micron core diameter and a 500-micron cladding diameter. The above-mentioned glass optical fiber will be referred to herein as a "gigabit glass optical fiber" (GbGOF). One example of a GbGOF is the OM4 multimode glass optical fiber with a 50-micron core diameter and a 125-micron cladding diameter. This GbGOF has bandwidth for 10 Gbits/sec over distances up to 400 meters. The transceiver design proposed herein has been proven experimentally to be capable of supporting a GbPOF network with optical link distance of at least 100 meters.

Illustrative embodiments of a pluggable single-wavelength, bidirectional transceivers with integrated fusion couplers are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Various embodiments of a fiber optical network for enabling optical communication between line replaceable units on an airplane at high data transmission rates (e.g., greater than 1 Gbits/sec) will be described in detail below for the purpose of illustration. However, implementation of the fiber optical networks disclosed herein is not limited solely to the environment of an airplane, but rather may be utilized in fiber optical networks onboard other types of vehicles or other types of fiber optical networks (e.g., long-distance terrestrial, data center and fiber-to-the-home/office applications). In addition, although the particular example embodiment disclosed in some detail hereinafter employs GbPOF, alternative embodiments may employ GbGOF.

One type of high-speed (over 1 Gbits/sec) single-wavelength transceiver has one fiber for the transmit (Tx) output optical signal and another fiber for the receive (Rx) input optical signal. The transmitter has a high-speed laser diode connected to a laser driver and transmitter (Tx) integrated circuit. The receiver has a high-bandwidth detector connected to an amplifier and a receiver (Rx) integrated circuit.

FIG. 1 is a diagram identifying some features of a single-wavelength dual-fiber transceiver 2 that transmits and receives light of the same wavelength $\lambda_1$. [As used herein, the term "wavelength" in the context of coherent laser light means the center wavelength of laser light having a narrow spectral width.] This single-wavelength dual-fiber transceiver 2 may be configured to comply with SFP specifications.

In the example depicted in FIG. 1, the single-wavelength dual-fiber transceiver 2 includes a laser 4 and a photodetector 8. The laser 4 can be implemented with single-mode distributed feedback (DFB) lasers, multi-mode Fabry-Pérot (FP) lasers or vertical cavity surface-emitting lasers (VCSEL) for high optical output power and low modal noise. The photodetector 8 can be implemented with a high-responsivity p-type intrinsic n-type (PIN) photodiode or an avalanche photodiode to provide high receiver sensitivity.

The laser 4 is driven to emit light of a wavelength $\lambda_1$ by a laser driver and transmit circuit 6 in response to receipt of differential transmit signals Tx$^+$ and Tx$^-$ from an associated line replaceable unit (not shown) via transmit electrical signal lines 12a and 12b respectively. The laser driver and transmit circuit 6 includes electrical circuitry that converts those differential signals to digital signals representing the data to be transmitted by the laser 4.

Conversely, the photodetector 8 receives light of wavelength $\lambda_1$ and converts that detected light into electrical digital signals which are provided to a detector amplifier and receive circuit 10. The detector amplifier and receive circuit 10 in turn includes electrical circuitry that converts those electrical digital signals to electrical differential receive signals Rx$^+$ and Rx$^-$ representing the data received. The electrical differential receive signals Rx$^+$ and Rx$^-$ are transmitted to other circuitry in the line replaceable unit via receive electrical signal lines 14a and 14b respectively.

The laser 4 is optically coupled to a glass optical fiber 18a, while the photodetector 8 is optically coupled to a glass optical fiber 18b. Both glass optical fibers 18a and 18b typically have cores made of the same material having an index of refraction selected to minimize the optical loss for any light of wavelength $\lambda_1$ being transmitted along the length of the fiber. The single-wavelength dual-fiber transceiver 2 depicted in FIG. 1 receives electrical power having a voltage V$_{cc}$ via transceiver power supply line 16.

The single-wavelength dual-fiber transceiver 2 depicted in FIG. 1 may be packaged in accordance with the industrial multi-source-agreement (MSA) standard with dimensions about 5.8 cm×1 cm×1 cm. The laser driver and transmit circuit 6 and detector amplifier and receive circuit 10 are surface mounted on a double-sided printed wiring board (PWB) (not shown in FIG. 1) which enables the single-wavelength dual-fiber transceiver 2 to be pluggable into an application hardware, such as a gigabit Ethernet (GBE) switch of a switching network that is connected to an LRU.

One next-generation avionics system design will use large-scale high-speed switching networks with gigabit plastic optical fiber (GbPOF) connections to replace the heavy, bulky and expensive copper cables for size, weight and power reduction. The key component that supports this system requirement is a high-speed transceiver that can be plugged into the switch of a large-scale switching network that provides optical interconnection of a large number of LRUs.

Figure 2:
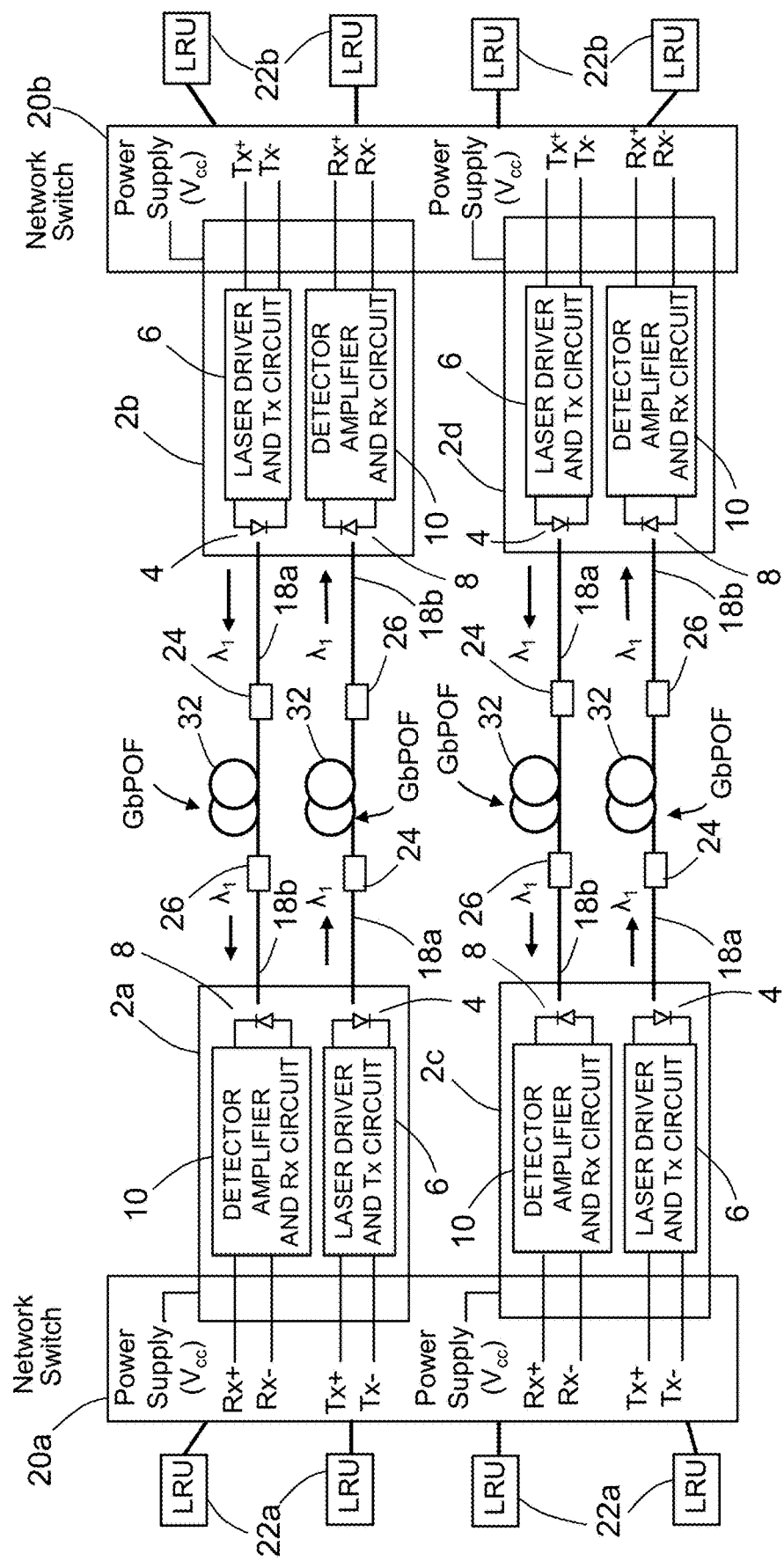
FIG. 2 is a diagram representing a bidirectional data transmission system having single-wavelength dual-fiber SFP transceivers with GbPOF links for enabling bidirectional data communication between optical network switches to which respective sets of LRUs are connected.

FIG. 2 shows the design concept for a bidirectional data transmission system having four single-wavelength dual-fiber transceivers 2a-2d with GbPOF links 32 for enabling bidirectional data communication between network switches 20a and 20b, to which respective sets 22a and 22b of LRUs (hereinafter "multiplicities of LRUs 22a and 22b") are connected. In this example, one end of each GbPOF link 32 is optically coupled to a respective laser 4 via a respective connector 24 and a respective glass optical fiber 18a and the other one end of each GbPOF link 32 is optically coupled to a respective photodetector 8 via a respective connector 26 and a respective glass optical fiber 18b.

Figure 3:
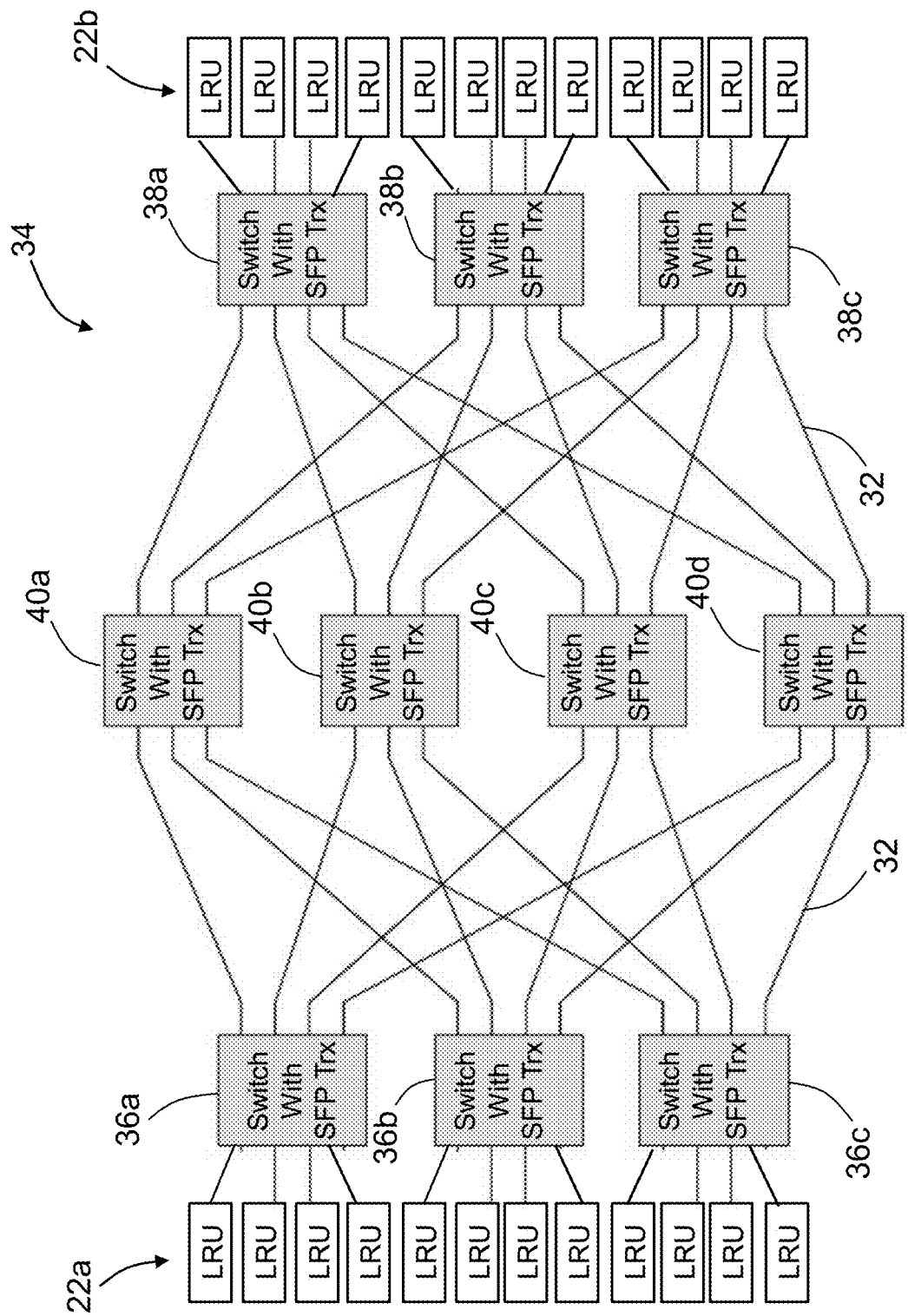
FIG. 3 is a block diagram showing one example of a large-scale optical network using GbPOF and SFP transceivers.

But in a large-scale switching network of the type depicted in FIG. 2, there will be a very large number of switches for the LRU connections. One example of a large-scale switching network 34 using GbPOF links and SFP transceivers is shown in FIG. 3. This large-scale switching network 34 includes a first multiplicity of switches with plugged-in SFP transceivers 36a-36c electrically coupled to a first multiplicity of LRUs 22a, a second multiplicity of switches with plugged-in SFP transceivers 38a-38c electrically coupled to a second multiplicity of LRUs 22b, and a third multiplicity of switches with plugged-in SFP transceivers 40a-40d which are optically coupled to the first and second multiplicities of switches with plugged-in SFP transceivers 36a-36c and 38a-38c.

In the large-scale switching network 34 of the type depicted in FIG. 3, a reduction of fiber count from two fibers to one fiber per transceiver would reduce the installation and labor cost by half by changing the two-fiber system to a single-fiber bidirectional system. The single-wavelength bidirectional pluggable transceiver disclosed herein makes such a single-wavelength bidirectional system feasible. The design and implementation process disclosed in some detail below provides a single-wavelength, single-fiber bidirectional pluggable transceiver optimized for GbPOF application. Using GbPOF would replace the use of expensive and fragile glass optical fiber, which further reduces the installation and re-work cost of a fiber optic switch network on an airplane.

Figure 4:
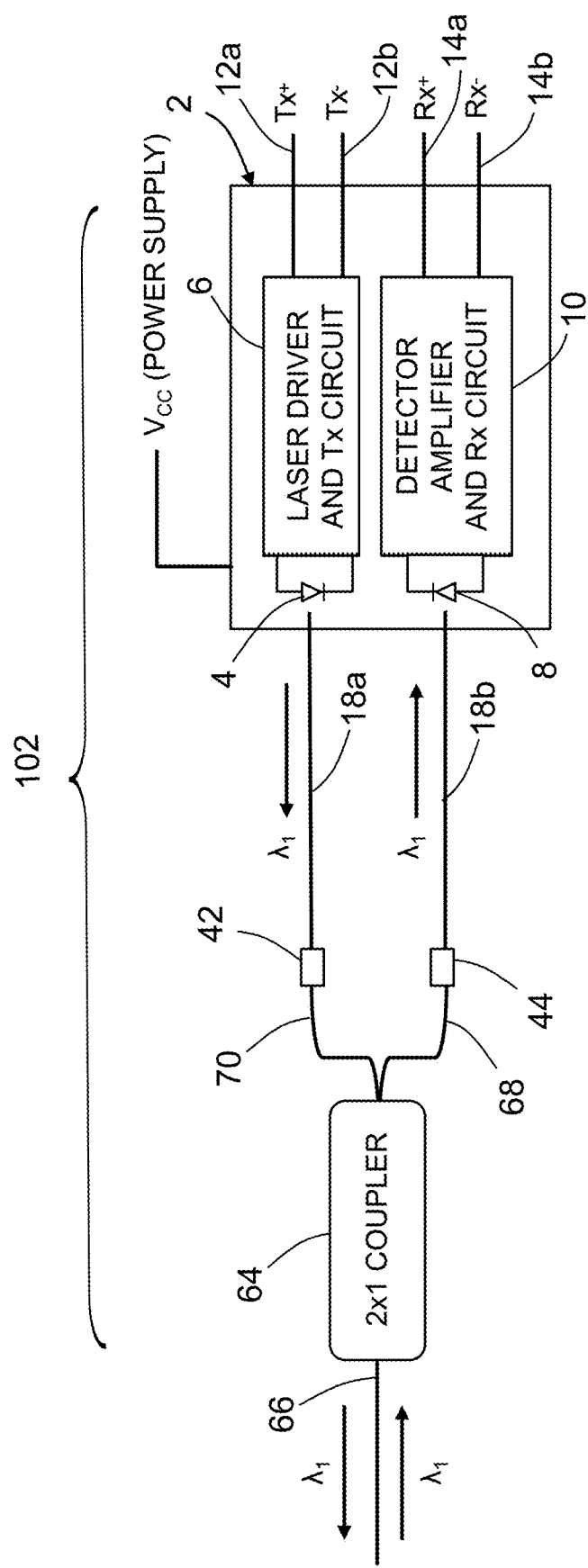
FIG. 4 is a block diagram representing the connection of a 2×1 fusion coupler to a single-wavelength dual-fiber SFP transceiver to form a single-wavelength single-fiber SFP transceiver.

FIG. 4 is a block diagram representing the connection of a 2×1 fusion coupler 64 having low optical loss and low back-reflection to a single-wavelength dual-fiber transceiver 2 to form a single-wavelength bidirectional (i.e., single-fiber) transceiver 102. More specifically, the 2×1 fusion coupler 64 includes: (1) an input/output optical fiber 66 that is connected and optically coupled to a GbPOF link (not shown in FIG. 4); (2) a detector optical subassembly (OSA) fiber 68 that is connected and optically coupled to a glass optical fiber 18b (which is in turn optically coupled to the photodetector 8 of the single-wavelength dual-fiber transceiver 2) by a connector 44; and (3) a laser optical subassembly (OSA) fiber 70 that is connected and optically coupled to a glass optical fiber 18a (which is in turn optically coupled to the laser 4 of the single-wavelength dual-fiber transceiver 2) by a connector 42. Alternatively, laser and detector OSA fibers 70 and 68 can be coupled directly to laser 4 and detector 8 without using glass optical fibers 18a and 18b because these fibers are the same type of multi-mode glass optical fiber.

Due to the long length of some of the fiber optical paths connecting transceivers in the forward section of an airplane to transceivers in the aft section of the airplane, it is common to use connectors to optically couple a plurality of shorter-length optical fibers in series. Many different types of optical fiber connectors exist and are commercially available. Accordingly, FIG. 4 does not seek to depict any particular configuration or type of optical fiber connector. Each of the connectors 42 and 44 may have a generally circular cylindrical structure. In addition, it is well known that some connectors include springs and associated structure for pushing the ends of two fiber optic devices into contact with each other. Such springs and associated structure are also not shown in FIG. 4.

When incorporated in a pluggable package (not shown in FIG. 4, but see FIG. 14), the 2×1 fusion coupler 64 and single-wavelength dual-fiber transceiver 2 form a single-wavelength bidirectional transceiver 102 that is pluggable into a network switch. Two such single-wavelength bidirectional transceivers 102 can have their respective input/output optical fibers 66 connected and optically coupled to each other via a GbPOF cable consisting of one or more GbPOF links connected in series. Two single-wavelength bidirectional transceivers 102 connected in this manner would enable respective LRUs in an avionics system to communicate with each other.

The design shown in FIG. 4 was proven experimentally to be capable of supporting a GbPOF network with an optical link distance of at least 100 meters. One advantage of this fusion coupler approach is the elimination of the scattering optical signal from the local laser to the local detector which may occur when a beam splitter is used in some other single-wavelength single-fiber transceivers. The back reflection of optical signals from the 2×1 fusion coupler 64 is also very low (below −40 dB). These two factors make the single-wavelength and single-fiber configuration feasible.

Figure 5:
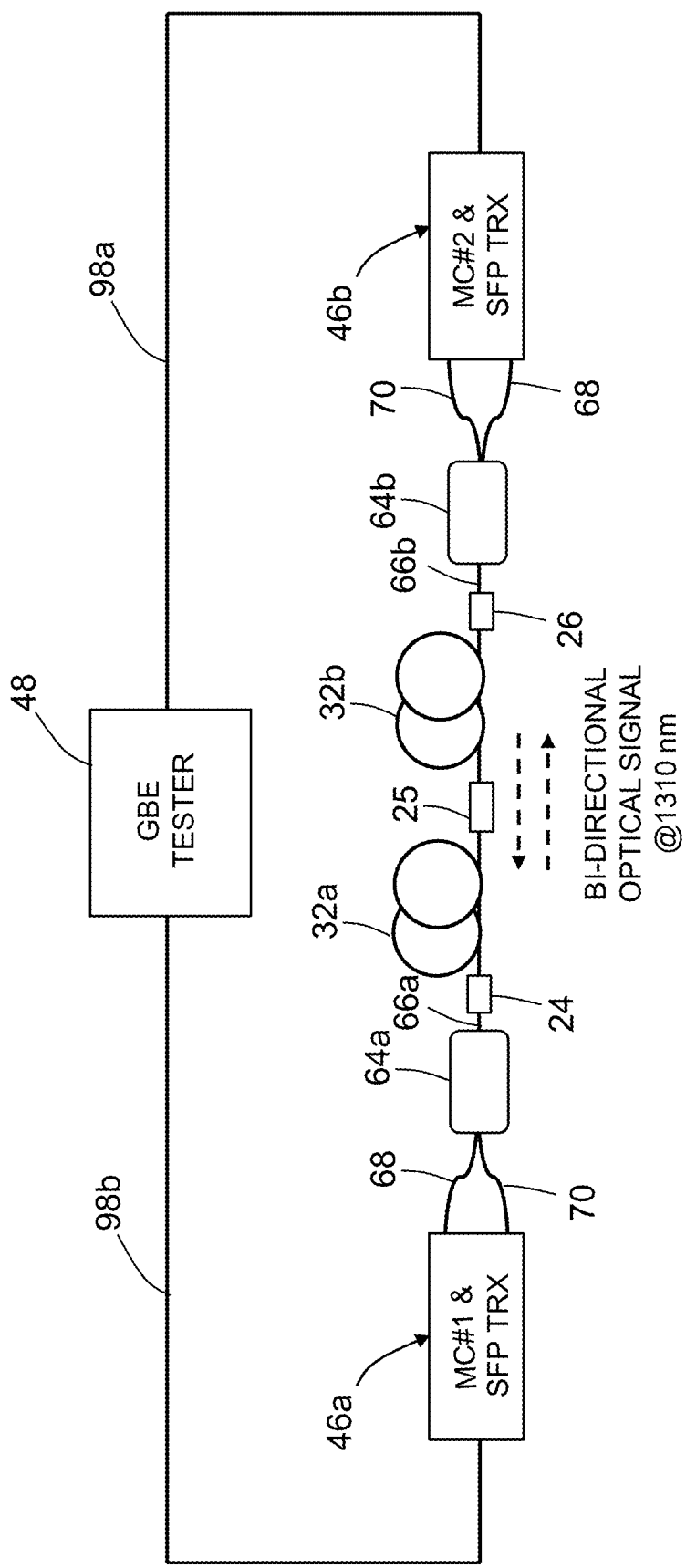
FIG. 5 is the block diagram showing the experimental set-up used to validate the proposed design of the single-wavelength operation of the transceiver shown in FIG. 4.

FIG. 5 is a block diagram showing an experimental set-up used to test the concept of single-wavelength bidirectional transceiver operation using external 2×1 fusion couplers 64a and 64b with single-wavelength dual-fiber SFP transceivers (not visible in FIG. 5) plugged into respective media converters 46a and 46b. The 2×1 fusion couplers 64a and 64b were optically coupled to the single-wavelength dual-fiber SFP transceivers in the manner depicted in FIG. 4. More specifically, the detector optical subassembly fiber 68 of the 2×1 fusion coupler 64a was optically coupled to photodetector 8 of the single-wavelength dual-fiber SFP transceiver that is plugged into media converter 46a, while the laser optical subassembly fiber 70 of the 2×1 fusion coupler 64a is optically coupled to laser 4 of the same single-wavelength dual-fiber SFP transceiver. Similarly, the detector optical subassembly fiber 68 of the 2×1 fusion coupler 64b is optically coupled to photodetector 8 of the single-wavelength dual-fiber SFP transceiver that is plugged into media converter 46b, while the laser optical subassembly fiber 70 of the 2×1 fusion coupler 64b is optically coupled to laser 4 of the same single-wavelength dual-fiber SFP transceiver. In addition, the input/output optical fiber 66 of the 2×1 fusion coupler 64a is connected and optically coupled to a GbPOF link 32a by a connector 24; the input/output optical fiber 66 of the 2×1 fusion coupler 64b is connected and optically coupled to a GbPOF link 32b by a connector 26; and the GbPOF links 32a and 32b are connected and optically coupled to each other by a connector 25.

In an experiment conducted using the setup depicted in FIG. 5, two dual-fiber SFP transceivers were respectively connected to two 2×1 fusion couplers 64a and 64b and a 100-meter GbPOF loop was connected to the input/output fibers 66a and 66b of the 2×1 fusion couplers 64a and 64b. The dual-fiber SFP transceivers were plugged into two Gigabit Ethernet (GBE) media converters 46a and 46b which were interfaced to a computer-controlled GBE tester 48 by way of two CAT 5 cables 98a and 98b. During this optical link operation, the GBE tester 48 sent and received bidirectional GBE packets and checked for bit errors and missing packets. The experimental results showed that error-free GBE operation was accomplished by the single-wavelength design shown in FIG. 4. More specifically, the test results showed that over a billion GBE packets were communicated through the 100-meter GbPOF link without missing any packets and with zero bit error.

FIG. 4 shows a design where an external 2×1 fusion coupler 64 is combined with a single-wavelength dual-fiber transceiver 2 to form a single-wavelength bidirectional transceiver 102. This design may be embodied in a pluggable package, e.g., of SFP type. One method for integrating the 2×1 fusion coupler 64 into a single-wavelength dual-fiber transceiver of the SFP type is depicted in FIGS. 6-15. The steps and principles to assemble this integrated pluggable single-wavelength bidirectional transceiver will now be described with reference to FIGS. 6-15.

Figure 6:
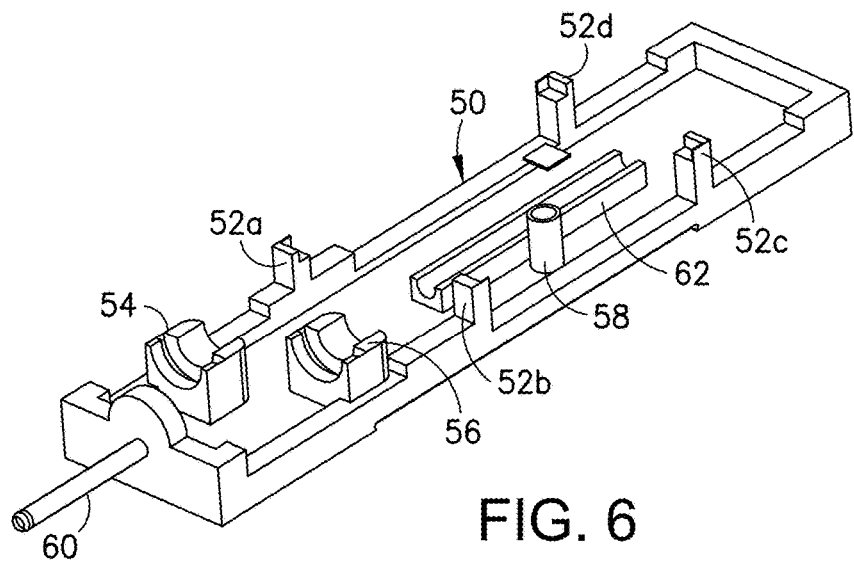

FIG. 6 is a diagram representing a three-dimensional visualization of a metal base 50 for a pluggable transceiver in accordance with one embodiment. This metal base 50 is preferably formed by a low-cost die cast molding process. The metal base 50 is designed to include the following features: four PWB support posts 52a-52d; a receive OSA holder 54; a transmit OSA holder 56; a PWB screw post 58; a fiber nose tube 60; and a coupler holder 62. The PWB support posts 52a-52d have specially designed recess slots where a PWB (not shown in FIG. 6, but see transceiver electronic circuit PWB 74 in FIG. 10) will be seated to enable the PWB's "plugging-in and removal" operation. The PWB screw post 58 is used to securely mount the PWB onto the metal base 50. The metal base 50 also has a fiber nose tube 60 for inserting the input/output fiber of the 2×1 fusion coupler (not shown in FIG. 6, but see 2×1 fusion coupler 64 in FIG. 7). The middle of metal base 50 has a coupler holder 62 for mounting the 2×1 fusion coupler at the proper position on the metal base 50.

Figure 7:
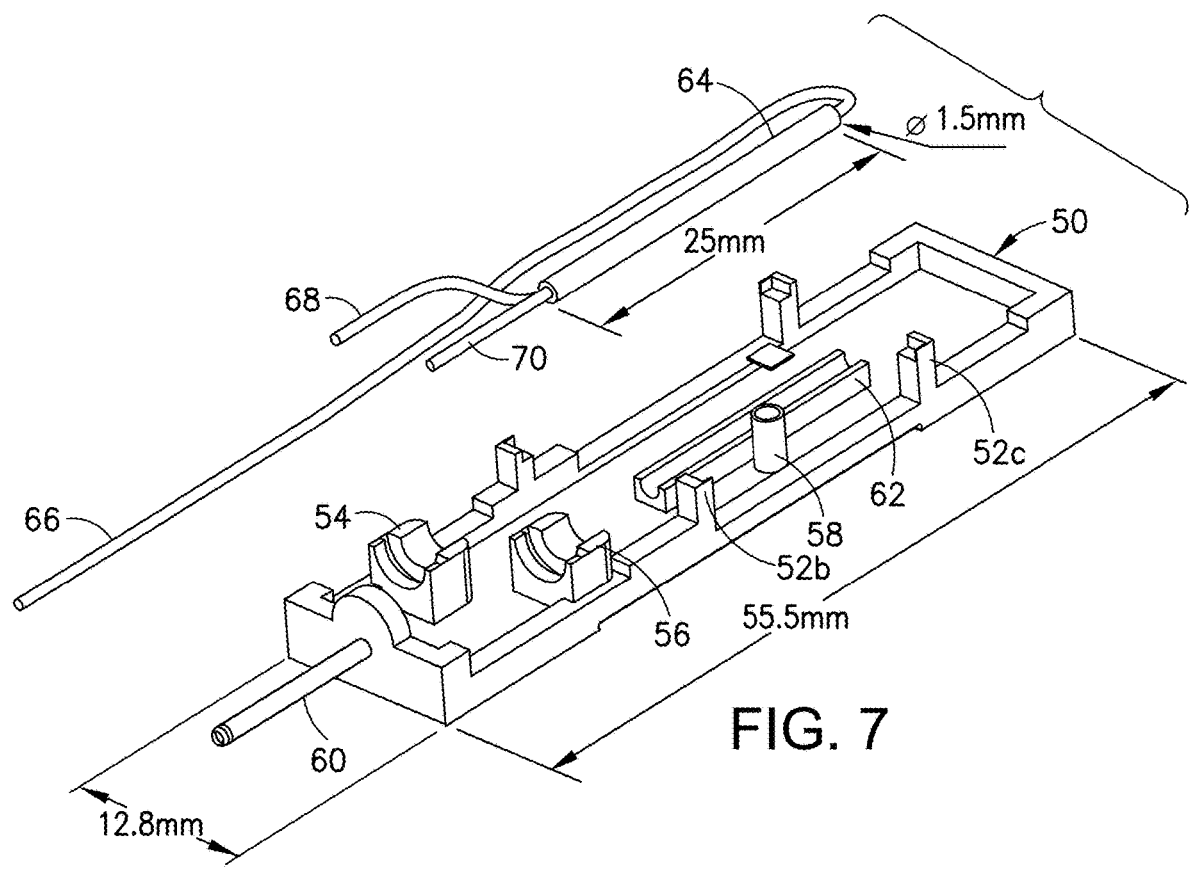

FIG. 7 is a diagram representing a three-dimensional visualization of the 2×1 fusion coupler 64 in preparation for mounting onto the metal base 50. In accordance with one proposed implementation, the metal base 50 has a length of 55.5 mm and a width of 12.8 mm, while the 2×1 fusion coupler 64 has a length of 25 mm and a diameter of 1.5 mm, as indicated in FIG. 7. This miniaturization of the 2×1 fusion coupler 64 enables the 2×1 fusion coupler 64 to be embedded inside an SFP transceiver.

As seen in FIG. 7, one end of the 2×1 fusion coupler 64 is connected and optically coupled to an input/output optical fiber 66, while the other end is split, the split ends being connected and optically coupled to a detector OSA fiber 68 and a laser OSA fiber 70, which are the input fibers of the 2×1 fusion coupler 64. The laser OSA fiber 70 is shorter than the detector OSA fiber 68. The input/output optical fiber 66 optically couples the input and output optical signals of the single-wavelength bidirectional transceiver. The end faces of all the fibers are cleaved to a defect-free finish.

Figure 8:
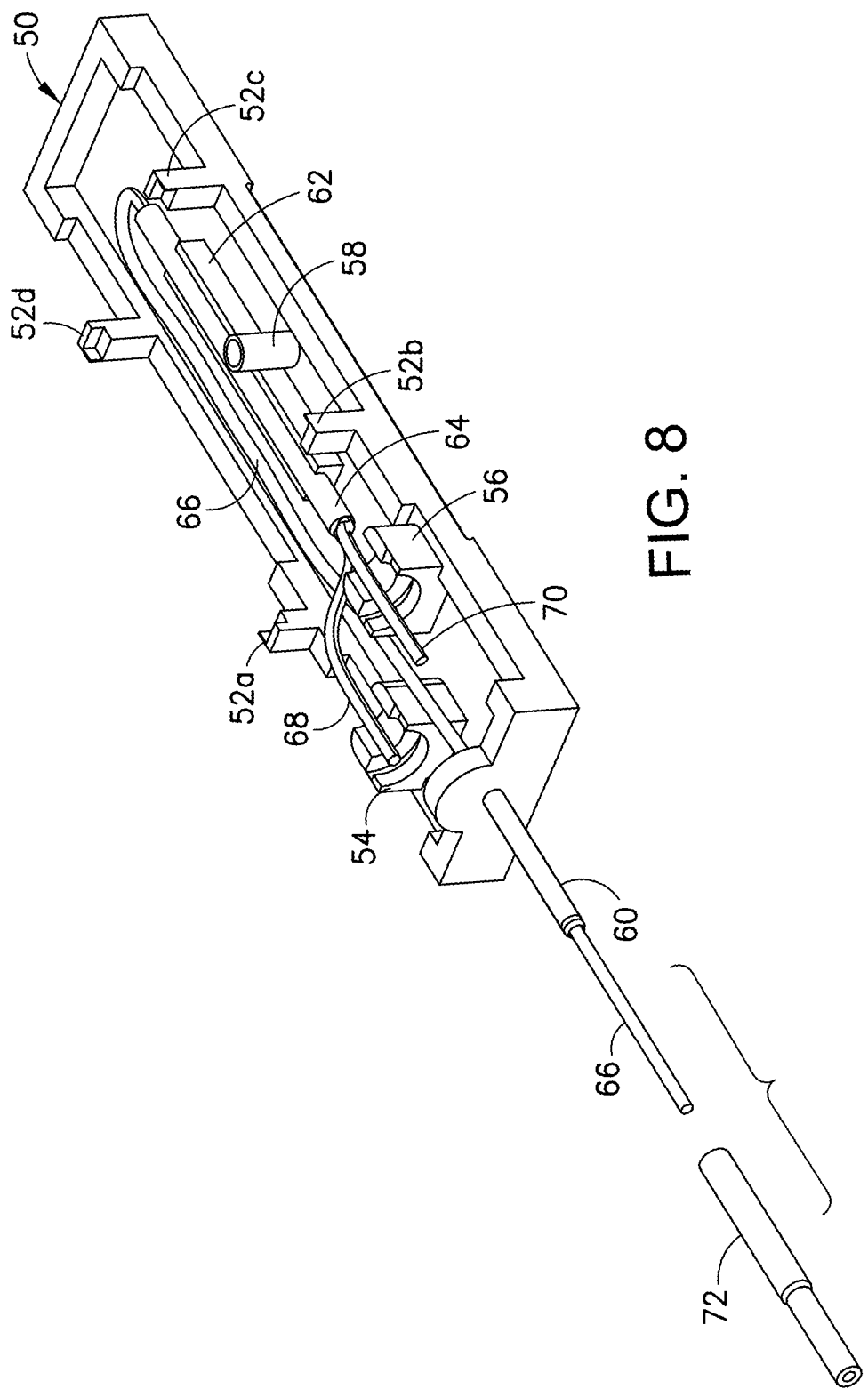

FIG. 8 is a diagram representing a three-dimensional visualization showing the attachment of the 2×1 fusion coupler 64 onto the metal base 50 and the positioning of a fiber boot 72 to be slid onto the fiber nose tube 60. More specifically, the input/output optical fiber 66 of the 2×1 fusion coupler 64 is inserted into the fiber nose tube 60 of the metal base 50. At the same time the 2×1 fusion coupler 64 is positioned onto the coupler holder 62 in the middle of the metal base 50. The 2×1 fusion coupler 64 is attached to the coupler holder 62 using space grade epoxy. In this position, a distal end section of the detector OSA fiber 68 is disposed over the receive OSA holder 54, while a distal end section of the laser OSA fiber 70 is disposed over the transmit OSA holder 56. Then a fiber boot 72 that conforms to the diameter of the nose tube 60 of the metal base 50 is prepared for sliding onto the fiber nose tube 60. When the fiber boot 72 is slid onto the fiber nose tube 60, the distal end of the input/output optical fiber 66 will project beyond the fiber boot 72, as seen in FIG. 9.

FIG. 9 is a diagram representing a three-dimensional visualization of an optical assembly 100 including the metal base 50, the 2×1 fusion coupler 64 and the fiber boot 72. This diagram shows the state of the optical assembly 100 after the fiber boot 72 has been slid onto the fiber nose tube 60, with the input/output optical fiber 66 being fed through the fiber boot 72 such that the distal end of the former projects beyond the end of the latter. The fiber boot 72 is attached to the metal base 50 using space grade epoxy. The fiber boot 72 provides strain relief for the input/output optical fiber 66 and also a bend radius limiter for the input/output optical fiber 66 to prevent breakage due to excessive bending.

FIG. 10 is a diagram representing a three-dimensional exploded visualization of components (prior to assembly) of a PBW assembly (not shown in FIG. 10, but see PBW assembly 92 in FIG. 11) designed to be mounted to the optical assembly 100 depicted in FIG. 9. The components depicted in FIG. 10 include the following: (a) a transceiver electronic circuit PWB 74 having printed transmit and receive circuitry and associated attached electronic chips; (b) a flex circuit 76 having one end connected to the transceiver electronic circuit PWB 74 and another end with a multiplicity of detector solder holes 77a; (c) a flex circuit 78 having one end connected to the transceiver electronic circuit PWB 74 and another end with a multiplicity of laser solder holes 77b; (d) a multiplicity (e.g., twenty) of transceiver input/output metal contacts 80 arranged at a pluggable end of the transceiver electronic circuit PWB 74 for making electrical contact with the application hardware after plugging in; (e) a screw through-hole 82 formed in the transceiver electronic circuit PWB 74; (f) a detector in a transistor outline (TO) can 84; (g) a detector housing 86 in which the detector in a TO can 84 will be housed; (h) a multiplicity of detector solder pins 87a connected to a base of the detector in a TO can 84; (i) a laser in a TO can 88; (j) a laser housing 90 in which the laser in a TO can 88 will be housed; and (k) a multiplicity of laser solder pins 87b connected to a base of the laser in a TO can 88. The two flex circuits 76 and 78 are fabricated for high-bandwidth connections with the detector and laser solder pins 87a and 87b. The flex circuits 76 and 78 are prepared with circular pads with solder holes for making electrical connection of the laser and detector to the transmitter and receiver electronics on the transceiver electronic circuit PWB 74. The preferred wavelength of the laser is in a range of 1270 to 1310 nm, where the optical loss of GbPOF is minimal.

FIG. 11 is a diagram representing a three-dimensional exploded visualization of the PBW assembly 92. The assembly method (not shown in FIG. 11) involves the following steps: (a) the detector in a TO can 84 is installed inside the detector housing 86 to form a detector OSA 101; (b) the detector OSA 101 is positioned so that the multiplicity of detector solder pins 87a of the detector OSA 101 are respectively inserted in the multiplicity of detector solder holes 77a formed in the flex circuit 76; (c) the multiplicity of detector solder pins 87a of the detector OSA 101 are then soldered to the multiplicity of detector solder holes 77a in the flex circuit 76; (d) the laser in a TO can 88 is installed inside the laser housing 90 to form a laser OSA 103; (e) the laser OSA 103 is positioned so that the multiplicity of laser solder pins 87b of the laser OSA 103 are respectively inserted in the multiplicity of laser solder holes 77b formed in the flex circuit 78; and (f) the multiplicity of laser solder pins 87b of the laser OSA 103 are then soldered to the multiplicity of laser solder holes 77b in the flex circuit 78.

Figure 12:
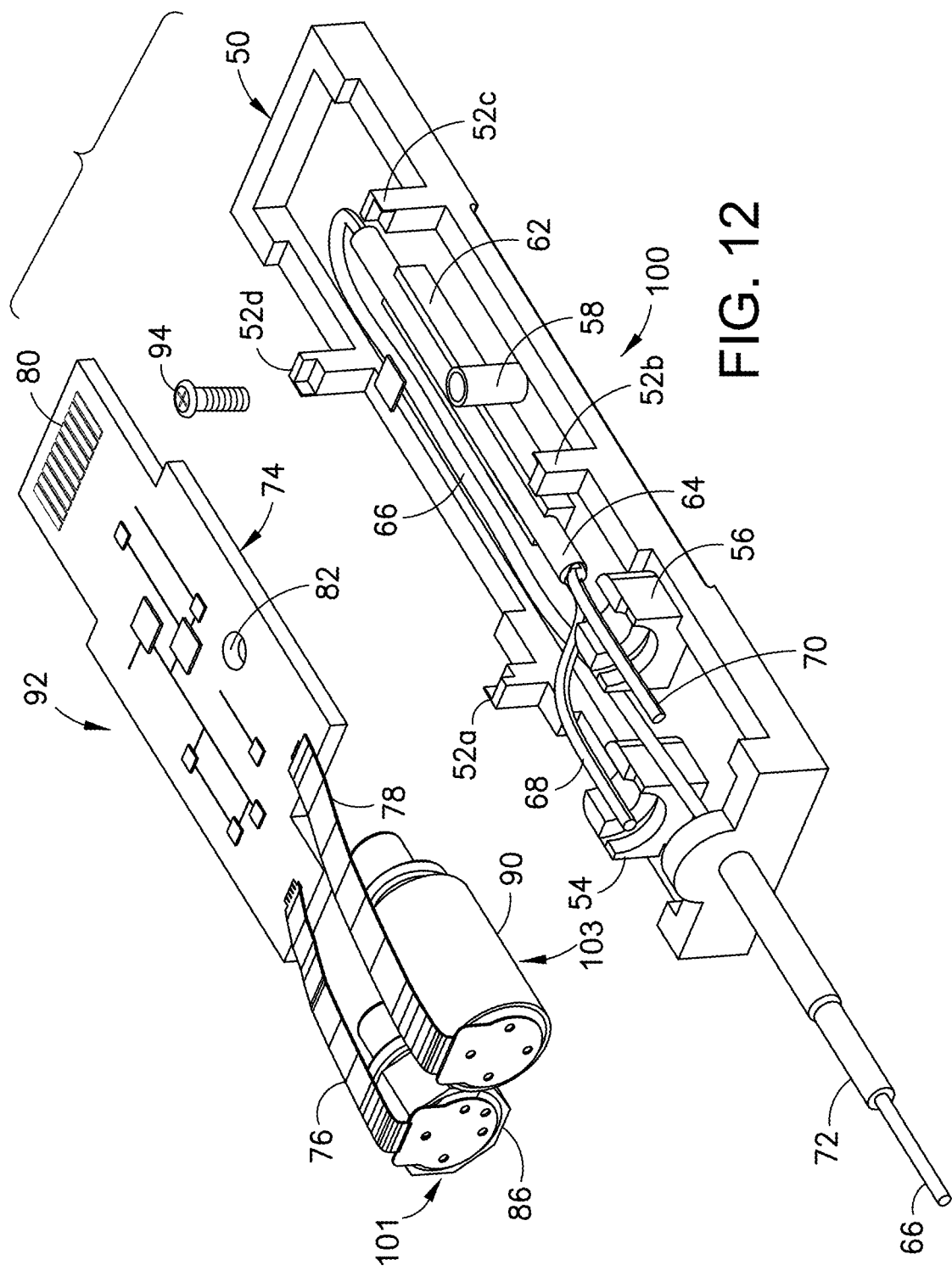

As shown in FIG. 12, the finished PWB assembly 92 is prepared to be attached to the metal base 50 populated with the 2×1 fusion coupler 64. A metal PWB screw 94 is shown ready to be screwed into PWB screw post 58 on the metal base 50 for securing the PWB assembly 92 to the optical assembly 100. More specifically, the assembly method (not shown in FIG. 12) involves the following steps: (a) To start, a small amount of space grade epoxy is applied on the recesses of the four PWB support posts 52a-52d and on the recesses of the receive OSA holder 54 and the transmit OSA holder 56 of the metal base 50. (b) Then the laser OSA fiber 70 and the detector OSA fiber 68 are respectively inserted into the laser OSA 103 and detector OSA 101. (c) Next the PWB assembly 92 is mounted onto the metal base 50 with the 2×1 fusion coupler 64 disposed below the transceiver electronic circuit PWB 74. The laser OSA 103 and detector OSA 101 are respectively seated on epoxy-coated recesses of the receive OSA holder 54 and transmit OSA holder 56. In addition, the transceiver electronic circuit PWB 74 is seated on the epoxy-coated recesses of the four PWB support posts 52a-52d. The space grade epoxy on the recesses of the four PWB support posts 52a-52d is used to attach the transceiver electronic circuit PWB 74 to the metal base 50, while the space grade epoxy on the recesses of the of the receive OSA holder 54 and transmit OSA holder 56 is used to respectively attach the laser OSA 103 and detector OSA 101 to the metal base 50. (d) Then the PWB screw 94 is inserted through the PWB screw through-hole 82 and securely screwed into the PWB screw post 58 of the metal base 50. The PWB assembly 92 is now attached to the metal base 50 securely for performing the "plugging and removal" function of the single-wavelength bidirectional transceiver 102 as shown in FIG. 13.

Figure 13:
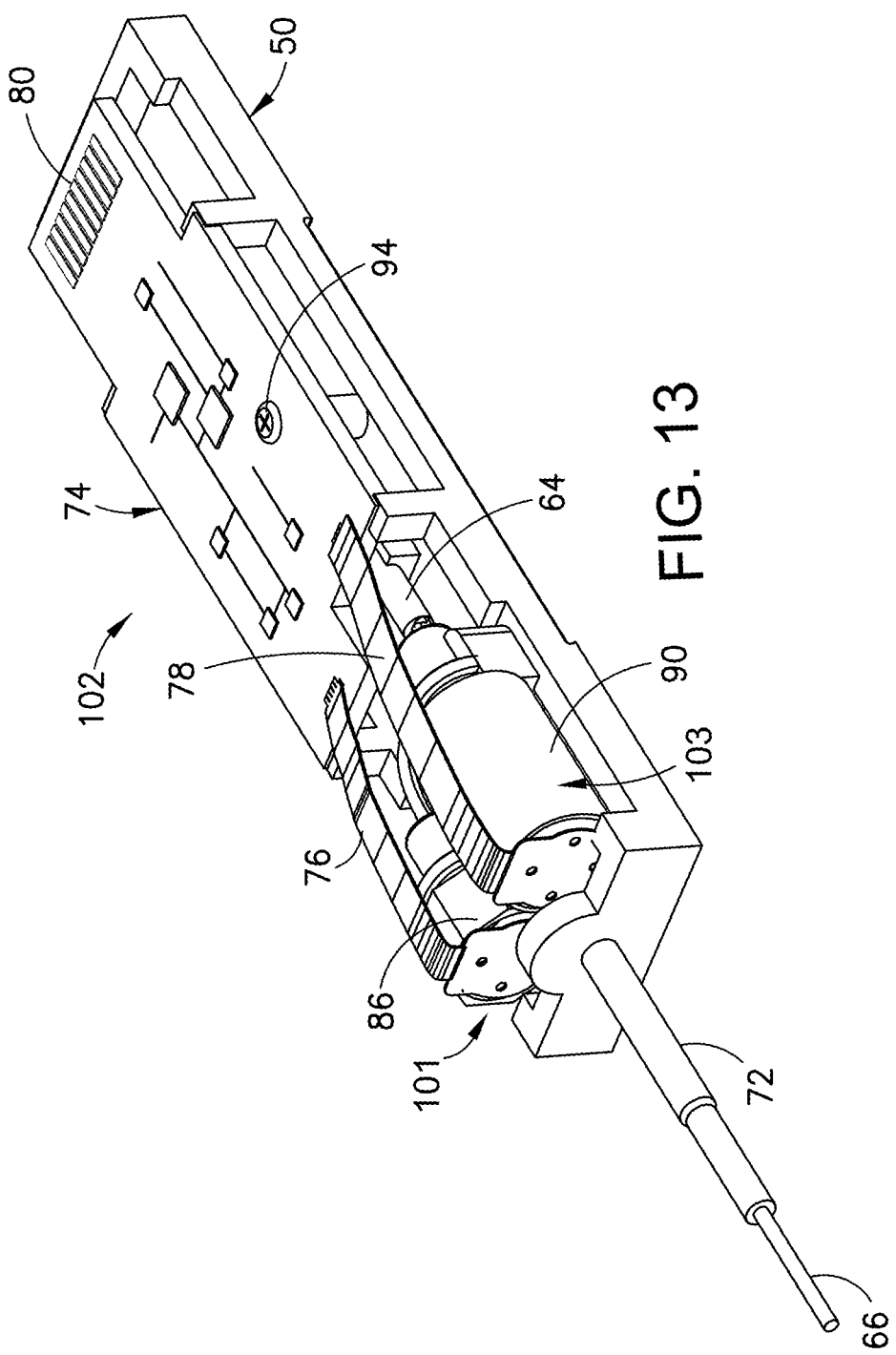

FIG. 13 is a diagram representing a three-dimensional visualization of the PBW assembly 92 attached to the metal base 50 with the 2×1 fusion coupler 64 disposed below the transceiver electronic circuit PWB 74 upon completion of the assembly method described in the preceding paragraph. The product resulting from this assembly method is a single-wavelength bidirectional transceiver 102.

Figure 14:
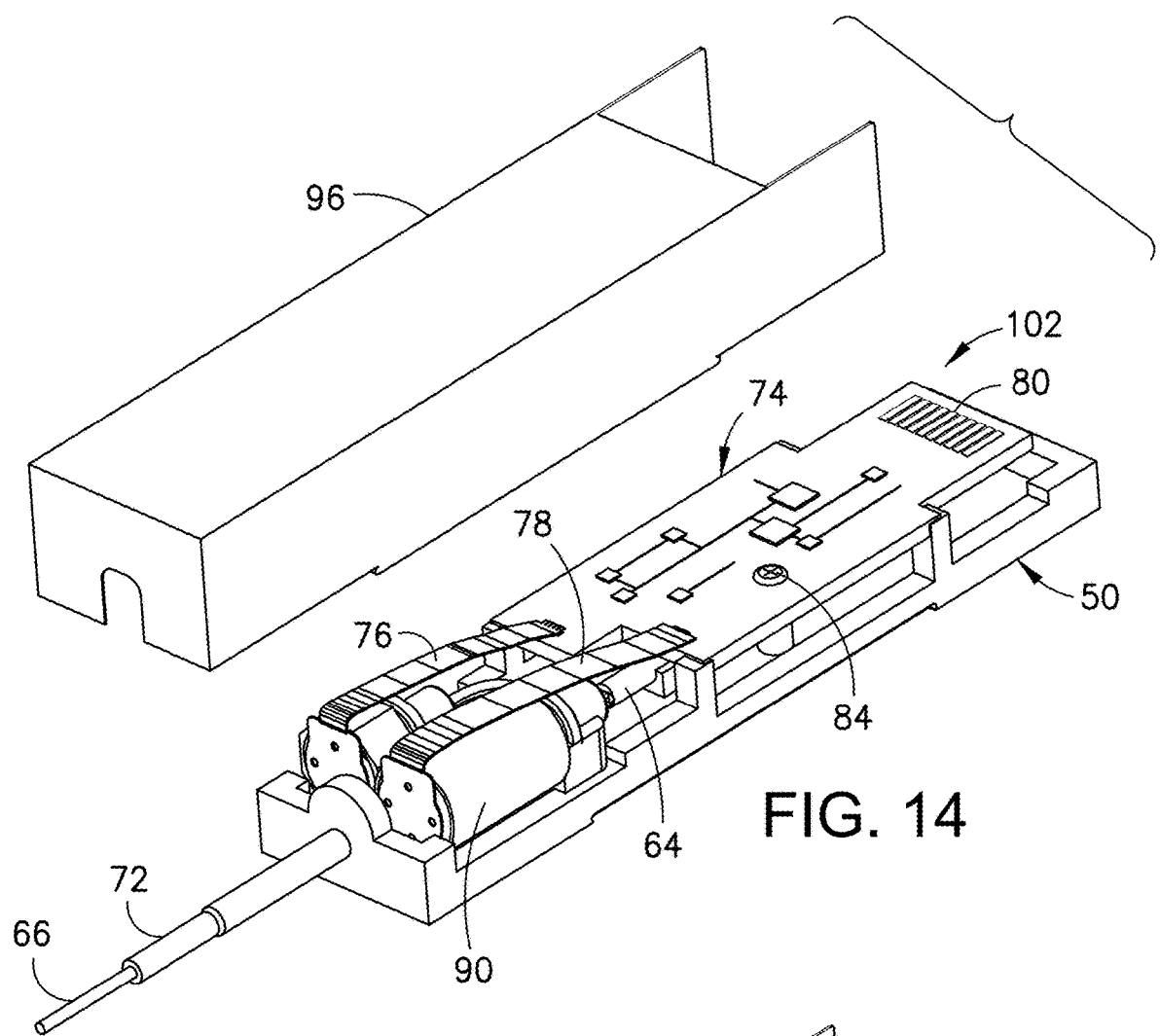

Following completion of the transceiver assembly process, the single-wavelength bidirectional transceiver 102 may be partly covered by a metal cover 96, shown in FIG. 14. The metal cover 96 conforms to the shape and dimensions of the single-wavelength bidirectional transceiver 102, but is open at one end to expose the transceiver input/output metal contacts 80. This enables the corresponding metal contacts on the application hardware to be in contact with the transceiver input/output metal contacts 80 when the single-wavelength bidirectional transceiver 102 is plugged into that application hardware.

Figure 15:
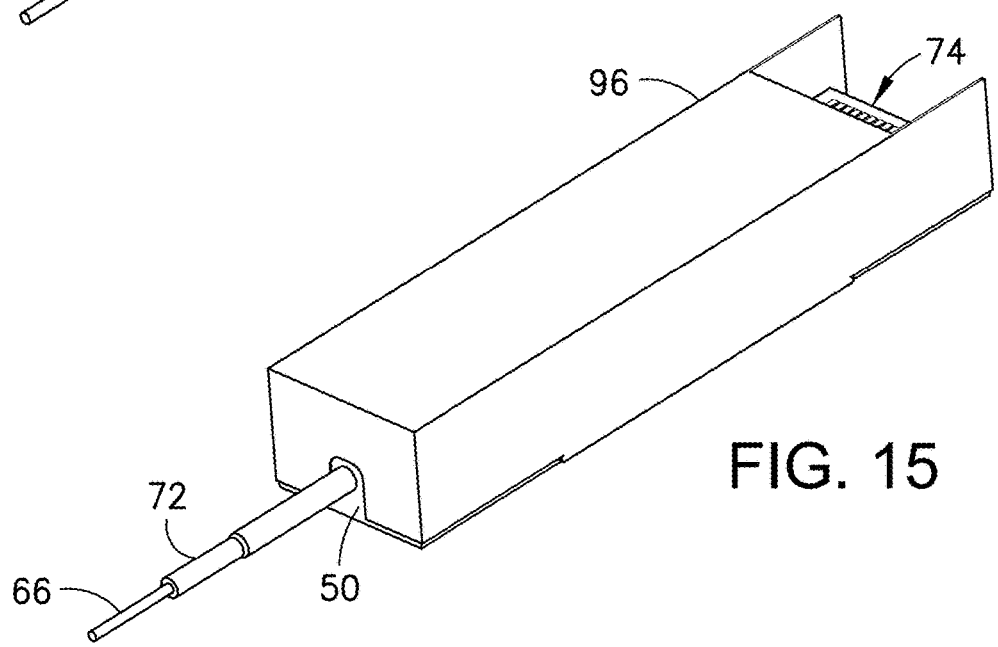

FIG. 15 is a diagram representing a three-dimensional visualization of the metal cover 96 attached to the sides of the metal base 50 using space grade epoxy. The metal cover 96 provides environmental and electro-magnetic protection to the single-wavelength bidirectional transceiver 102. The transceiver assembly process is completed after this step. The single-wavelength bidirectional transceiver 102 is now pluggable and removable from the application hardware (e.g., a switch of a switching network). The dimensions of the single-wavelength bidirectional transceiver 102 may conform to SFP specifications.

In conclusion, this disclosure has proposed using hybrid integration of a multi-mode 2×1 glass optical fiber fusion coupler with low back reflection and low cross-talk into an existing two-fiber SFP transceiver. This approach allows the resulting single-wavelength bidirectional transceiver design to retain all of the beneficial characteristics of the well-established dual-fiber SFP transceiver, while eliminating the cross-talk problem between the local transmitter and local receiver. The proposed fabrication process is low cost and manufacturable to support a future generation of fuel-efficient airplanes' large-scale switching network requirements. In addition, the technical features disclosed herein are valuable because of the huge cost savings that result from reducing the fiber optic cable count in an airplane.

The system described above may in the alternative be implemented using all glass optical fiber. The use of GbPOF is a special application (or solution) where glass fiber is a problem for airplane installation. But for many long-distance terrestrial, data center and fiber-to-the-home/office applications (non-aerospace), glass optical fiber installation is not a major problem.

While optical networking systems have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The method claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the method claims be construed to exclude any portions of two or more steps being performed concurrently or alternatingly unless the claim language explicitly states a condition that precludes such an interpretation.

The invention claimed is:

1. An apparatus comprising:
   a 2×1 fusion coupler;
   an input/output optical fiber connected to the 2×1 fusion coupler;
   a detector optical subassembly fiber connected to the 2×1 fusion coupler;
   a laser optical subassembly fiber connected to the 2×1 fusion coupler;
   a transceiver comprising a transceiver electronic circuit printed wiring board, a laser optical subassembly electrically coupled to the transceiver electronic circuit printed wiring board and a detector optical subassembly electrically coupled to the transceiver electronic circuit printed wiring board, wherein the laser optical subassembly comprises a laser that is situated to transmit light to the laser optical subassembly fiber, and the detector optical subassembly comprises a photodetector that is situated to receive light from the detector optical subassembly fiber; and
   a metal base, wherein the transceiver electronic circuit printed wiring board and the 2×1 fusion coupler are attached to the metal base, and the 2×1 fusion coupler is disposed between the metal base and the transceiver electronic circuit printed wiring board.

2. The apparatus as recited in claim 1, wherein the transceiver electronic circuit printed wiring board comprises a multiplicity of transceiver input/output metal contacts arranged at one end of the transceiver electronic circuit printed wiring board.

3. The apparatus as recited in claim 2, further comprising a metal cover, wherein the transceiver electronic circuit printed wiring board and the metal cover are attached to the metal base, and the metal cover is open at one end to expose the transceiver input/output metal contacts, thereby enabling the corresponding metal contacts on an application hardware to be in contact with the transceiver input/output metal contacts when the one end of the transceiver electronic circuit printed wiring board is plugged into that application hardware.

4. The apparatus as recited in claim 1, wherein the laser and detector optical subassemblies and the transceiver electronic circuit printed wiring board are attached to the metal base.

5. The apparatus as recited in claim 4, further comprising a pair of flex circuits that respectively electrically connect the laser and detector optical subassemblies to the transceiver electronic circuit printed wiring board.

6. The apparatus as recited in claim 1, wherein the metal base comprises a fiber nose tube projecting from one end of the metal base, and the input/output optical fiber passes through the fiber nose tube.

7. The apparatus as recited in claim 6, further comprising a fiber boot that surrounds the fiber nose tube and a portion of the input/output optical fiber that projects beyond a distal end of the fiber nose tube.

8. The apparatus as recited in claim 1, wherein the 2×1 fusion coupler, the input/output optical fiber, the detector optical subassembly fiber and the laser optical subassembly fiber are made of glass.

9. The apparatus as recited in claim 1, wherein the 2×1 fusion coupler has a length of about 25 mm and a diameter of about 1.5 mm.

10. A data transmission system comprising:
- an optical cable comprising an optical fiber capable of carrying bits of data at a bit rate of at least one gigabit;
- a 2×1 fusion coupler optically coupled to one end of the optical cable;
- a transceiver comprising a transceiver electronic circuit printed wiring board, a detector optical subassembly optically coupled to the 2×1 fusion coupler and electrically coupled to the transceiver electronic circuit printed wiring board, and a laser optical subassembly optically coupled to the 2×1 fusion coupler and electrically coupled to the transceiver electronic circuit printed wiring board, wherein the laser optical subassembly comprises a laser that is situated to transmit light to the 2×1 fusion coupler, and the detector optical subassembly comprises a photodetector that is situated to receive light from the 2×1 fusion coupler; and
- a metal base, wherein the transceiver electronic circuit printed wiring board and the 2×1 fusion coupler are attached to the metal base, and the 2×1 fusion coupler is disposed between the metal base and the transceiver electronic circuit printed wiring board.

11. The data transmission system as recited in claim 10, wherein the optical fiber is made of plastic.

12. The data transmission system as recited in claim 10, wherein the 2×1 fusion coupler is made of glass and has a length of about 25 mm and a diameter of about 1.5 mm.

13. The data transmission system as recited in claim 10, further comprising:
- a switch connected to the transceiver; and
- a line replaceable unit connected to the switch.

14. The data transmission system as recited in claim 10, wherein the transceiver electronic circuit printed wiring board comprises a multiplicity of transceiver input/output metal contacts arranged at one end of the transceiver electronic circuit printed wiring board, further comprising a metal cover, wherein the transceiver electronic circuit printed wiring board and the metal cover are attached to the metal base, and the metal cover is open at one end to expose the transceiver input/output metal contacts, thereby enabling the corresponding metal contacts on an application hardware to be in contact with the transceiver input/output metal contacts when the one end of the transceiver electronic circuit printed wiring board is plugged into that application hardware.

15. The data transmission system as recited in claim 10, wherein the laser and detector optical subassemblies are attached to the metal base.

16. The data transmission system as recited in claim 15, further comprising a pair of flex circuits that respectively electrically connect the laser and detector optical subassemblies to the transceiver electronic circuit printed wiring board.

17. A method for assembling a pluggable transceiver package, comprising:
- connecting an input/output optical fiber, a detector optical subassembly fiber and a laser optical subassembly fiber to a 2×1 fusion coupler;
- inserting the input/output optical fiber into a fiber nose tube projecting from one end of a metal base;
- attaching the 2×1 fusion coupler to the metal base;
- connecting laser and detector optical subassemblies to a transceiver electronic circuit printed wiring board by way of respective flex circuits;
- inserting one end of the detector optical subassembly fiber inside a detector optical subassembly;
- inserting one end of the laser optical subassembly fiber inside a laser optical subassembly;
- attaching the laser and detector optical subassemblies to the metal base;
- positioning the transceiver electronic circuit printed wiring board so that the 2×1 fusion coupler is between the transceiver electronic circuit printed wiring board and metal base; and
- attaching the transceiver electronic circuit printed wiring board to the metal base.

18. The method as recited in claim 17, further comprising:
- sliding a fiber boot onto the fiber nose tube; and
- attaching the fiber boot to the fiber nose tube on the metal base.

19. The method as recited in claim 17, further comprising: placing a metal cover over the laser and detector optical subassemblies and the transceiver electronic circuit printed wiring board; and attaching the metal cover to the metal base, wherein the metal cover is open at one end to expose a multiplicity of transceiver input/output metal contacts on the transceiver electronic circuit printed wiring board, thereby enabling the corresponding metal contacts on an application hardware to be in contact with the transceiver input/output metal contacts when the open end of the transceiver electronic circuit printed wiring board is plugged into that application hardware.

* * * * *